(12) United States Patent
Liang et al.

(10) Patent No.: US 11,732,834 B2
(45) Date of Patent: Aug. 22, 2023

(54) SPLIT-TYPE AUTOMATIC LIFTING BRACKET DEVICE AND SANITARY PRODUCT

(71) Applicant: Kohler (China) Investment Co., Ltd., Shanghai (CN)

(72) Inventors: Cunli Liang, Shanghai (CN); Congxian Huang, Shanghai (CN); Bing Dai, Shanghai (CN)

(73) Assignee: Kohler (China) Investment Co., Ltd., Shanghai (CN)

( * ) Notice: Subject to any disclaimer, the term of this patent is extended or adjusted under 35 U.S.C. 154(b) by 0 days.

(21) Appl. No.: 17/408,089

(22) Filed: Aug. 20, 2021

(65) Prior Publication Data
US 2022/0065388 A1 Mar. 3, 2022

(30) Foreign Application Priority Data
Aug. 25, 2020 (CN) .......................... 202021819946.8

(51) Int. Cl.
*F16M 11/04* (2006.01)
*F16M 11/18* (2006.01)
(Continued)

(52) U.S. Cl.
CPC ........... *F16M 11/046* (2013.01); *A47K 13/10* (2013.01); *F16M 11/18* (2013.01); *A47K 3/122* (2013.01); *E03C 1/32* (2013.01); *E03D 13/005* (2013.01)

(58) Field of Classification Search
CPC ....... A47K 13/10; E03C 1/328; E03D 11/143; F16M 11/046
(Continued)

(56) References Cited

U.S. PATENT DOCUMENTS 2,937,718 A * 5/1960 Larson .................... E03C 1/328
  318/749
4,091,473 A * 5/1978 Matthews ............. E03D 11/143
  4/300
(Continued)

FOREIGN PATENT DOCUMENTS

CN 204199418 U 3/2015
CN 106436860 A 2/2017
(Continued)

OTHER PUBLICATIONS

Examination Report from Indian Patent Application No. 202114038165, dated Mar. 21, 2022, 6 pages.

*Primary Examiner* — Christine J Skubinna
(74) *Attorney, Agent, or Firm* — Lempia Summerfield Katz LLC

(57) ABSTRACT

The present disclosure provides a split-type automatic lifting bracket device and a sanitary product. The split-type automatic lifting bracket device comprises an upper bracket assembly and a lower bracket assembly, wherein the upper bracket assembly is used for bearing a water receiver or a waterway control valve; and the lower bracket assembly is used for bearing or supporting and driving a sanitary product to rise and descend, and comprises a self-supporting leg assembly, an auxiliary standing device, an automatic lifting control device, a lifting bracket, a push-pull power device, a rolling guide device, and the sanitary product. The lifting structure of the present application can rise and descend automatically without an additional force to assist in height adjustment. The water receiver and other structures are not provided on the lifting bracket, so that a weight for the lifting structure to rise is reduced.

18 Claims, 4 Drawing Sheets

(51) Int. Cl.
  *A47K 13/10* (2006.01)
  *E03C 1/32* (2006.01)
  *A47K 3/12* (2006.01)
  *E03D 13/00* (2006.01)

(58) Field of Classification Search
  USPC ......................................................... 4/252.2
  See application file for complete search history.

(56) References Cited

U.S. PATENT DOCUMENTS

| | | | | | |
|---|---|---|---|---|---|
| 4,558,472 | A | * | 12/1985 | Fromme | ................... E03C 1/01 |
| | | | | | 4/252.3 |
| 2004/0226087 | A1 | * | 11/2004 | Young | ..................... E03C 1/328 |
| | | | | | 4/645 |
| 2019/0006906 | A1 | * | 1/2019 | Taketani | ................. E03D 5/105 |

FOREIGN PATENT DOCUMENTS

| | | | |
|---|---|---|---|
| CN | 108128457 | A | 6/2018 |
| CN | 108797743 | A | 11/2018 |

\* cited by examiner

SPLIT-TYPE AUTOMATIC LIFTING BRACKET DEVICE AND SANITARY PRODUCT

CROSS REFERENCE TO RELATED APPLICATION

This application claims the benefit of priority to Chinese Patent Application No. 202021819946.8 filed in the Chinese Intellectual Property Office on Aug. 25, 2020, the contents of which are hereby incorporated by reference in its entirety.

FIELD

The present disclosure relates to a split-type automatic lifting bracket device and a sanitary product using the bracket device.

BACKGROUND

Toilets, basins, shower room stools, toilet seats, urinals, and the like are sanitary products needing to be used in daily life.

At present, all common toilets or toilet seats cannot rise and descend, which are very inconvenient for the elderly people and children to use. Because of the weakness of legs and feet, the elderly people generally require the toilet or toilet seat to rise to help them sit down and get up. Due to the height, the children generally require the toilet or toilet seat to descend to help them sit down and get up. However, at present, there is a lack of a toilet or toilet seat that can take care of both the elderly and the children at the same time.

Similarly, since heights and physical conditions of people are different, different people need basins or hand basins of different heights; and need shower room stools of different heights during bathing. For other sanitary products, there is also a problem that one product needs to adapt to different heights.

Therefore, it is necessary to design a lifting structure to solve the above problems encountered by the elderly and the children. When being used by the elderly, the lifting structure may rise to a comfortable position for the elderly, and when being used by the children, the lifting structure may descend to a convenient position for the children to use. In addition, a height of the lifting structure may be conveniently adjusted to meet the requirements of different crowds.

SUMMARY

The technical problem to be solved by the present disclosure is to provide a split-type automatic lifting bracket device, which can rise and descend automatically without an additional force to assist in height adjustment.

In order to solve the above technical problem, the present disclosure provides a lifting structure, which comprises two independent assemblies, i.e., an upper bracket assembly and a lower bracket assembly, wherein the upper bracket assembly is used for bearing or supporting a water receiver and/or a waterway control valve. The lifting structure may also comprise the lower bracket assembly is used for bearing or supporting and driving a sanitary product to rise and descend. The lower bracket assembly comprises a self-supporting leg assembly, wherein the self-supporting leg assembly supports the whole device. The lower bracket assembly may also comprise a lifting bracket, wherein the lifting bracket is movably connected with the self-supporting leg assembly through a rolling guide device. The lower bracket assembly may also comprise a push-pull power device, wherein one end of the push-pull power device is fixed with the self-supporting leg assembly, the other end of the push-pull power device is fixed with the lifting bracket, and the push-pull power device is used for providing power for the sanitary product to rise and descend. The lower bracket assembly may also comprise the rolling guide device, wherein the rolling guide device comprises a rolling bearing and a guidepost, the rolling bearing is fixed on the lifting bracket, and the guidepost is fixed on the self-supporting leg assembly, so that the lifting bracket moves up and down along the guidepost relative to the self-supporting leg assembly under the drive of the push-pull power device, and a fixing mode of the rolling guide device is adjusted as required. The body of the sanitary product is connected with the lifting bracket. A water source of the body of the sanitary product is split from the lifting bracket. The body of the sanitary product employs a flexible pipeline or a telescopic structure and is directly or indirectly connected with the water source and/or a sewage pipeline. The lifting structure may also comprise an automatic lifting control device, wherein the automatic lifting control device comprises a control switch and a control mainboard, the control switch controls the push-pull power device through the control mainboard to drive the lifting bracket to move up and down.

The lifting structure of the present disclosure has the beneficial effects that the lifting structure may rise and descend automatically without needing an additional force to assist in height adjustment. In addition, the water receiver or the waterway control valve is not provided on the lifting bracket, so that a weight for rising of the lifting structure is reduced, and the movable sanitary product may be driven by the push-pull power device with a lower power, thus reducing a cost. Since a weight of a movable part is reduced, a stress on the rolling guide device and other components is reduced, and a service life of each part of the lifting structure is prolonged.

In an embodiment, an auxiliary standing device is further comprised, wherein the auxiliary standing device is a handrail; the auxiliary standing device is fixedly connected with the lifting bracket through a lifting board, rising and descending together with the sanitary product; or is fixed on the self-supporting leg assembly as required, without rising and descending with the sanitary product.

In an embodiment, the push-pull power device is driven by a hydraulic, or pneumatic or electric motor, and is matched with a corresponding mechanical transmission system; and the mechanical transmission system is a gear transmission system, a worm transmission system or a gear-worm composite transmission system, and outputs a pushing force of no greater than 4,000 N.

In an embodiment, the self-supporting leg assembly is fixed on the ground, and/or is fixed with an object on the ground, behind, or left and right side.

In an embodiment, the split-type automatic lifting bracket device further comprises a panel, wherein the panel is mounted between the sanitary product and the lifting bracket; and the panel is a glass or engineering plastic, or ceramic or metal panel.

In an embodiment, the control switch is mounted on the auxiliary standing device or the panel.

In an embodiment, one end of the sewage pipeline is communicated with the body of the sanitary product and fixed on the lifting bracket at the same time, and the other end of the sewage pipeline is flexibly and hermetically communicated with a sewage pipeline of a building.

In an embodiment, the sewage pipeline is mounted and fixed at a certain inclination angle.

The present disclosure further provides a sanitary product, which comprises the above split-type automatic lifting bracket device.

The sanitary product of the present disclosure has the beneficial effects that the sanitary product may rise and descend automatically without needing an additional force to assist in height adjustment. In addition, the water receiver or the waterway control valve is not provided on the lifting bracket, so that a weight for the lifting structure to rise is reduced, and the movable sanitary product may be driven by the push-pull power device with a lower power, thus reducing a cost. Since a weight of a movable part is reduced, a stress on the rolling guide device and other components is reduced, and a service life of each part of the lifting structure is prolonged.

In an embodiment, the sanitary product is a toilet, a basin, a shower room stool, a toilet seat or a urinal.

BRIEF DESCRIPTION OF THE FIGURES

The present disclosure is further described in detail hereinafter with reference to the accompanying drawings and the specific embodiments.

Figure 1:
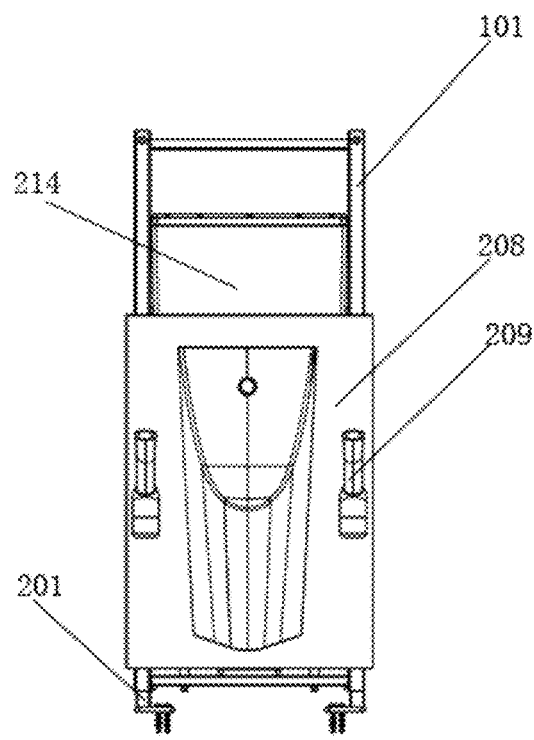
FIG. 1 is a front view of a split-type automatic lifting bracket device according to Embodiment 1.

The reference numerals in the drawings are respectively as follows:

101 refers to upper bracket assembly, and 102 refers to lower bracket assembly;

201 refers to self-supporting leg assembly, 202 refers to push-pull power device, 203 refers to automatic lifting control device, 204 refers to rolling guide device, 205 refers to lifting bracket, 206 refers to lifting board, 207 refers to fixing bolt of lifting board, 208 refers to panel, 209 refers to auxiliary standing device, 210 refers to body of sanitary product, 211 refers to control switch, 212 refers to sewage pipeline of sanitary product, 213 refers to sewage pipeline of building, 214 refers to water receiver, and 215 refers to water inlet pipe of sanitary product;

300 refers to a system for controlling the split-type automatic lifting bracket device; 310 refers to an automatic lifting control device, 311 refers to a control switch, 312 refers to a control mainboard, 320 refers to a memory, and 330 refers to a communication interface.

DETAILED DESCRIPTION

Embodiment 1

Figure 2:
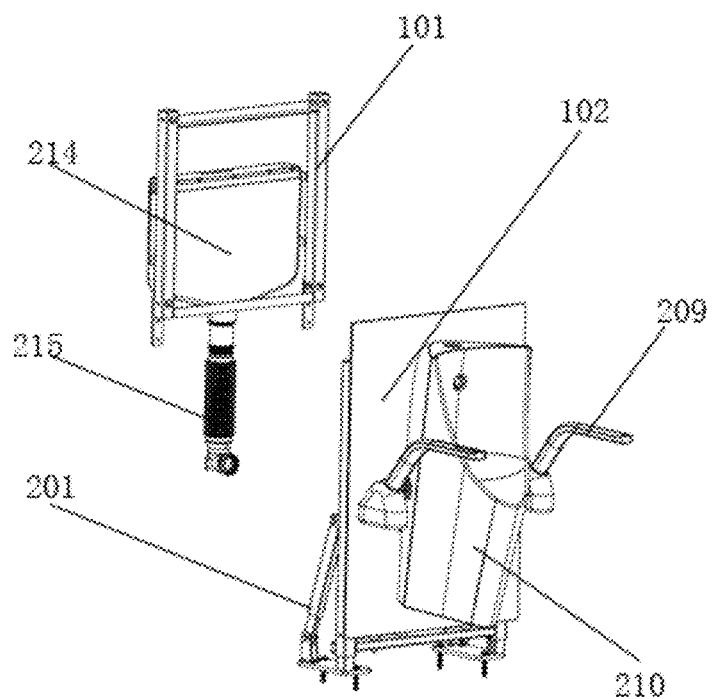
FIG. 2 is a stereoscopic diagram of the split-type automatic lifting bracket device according to Embodiment 1.
Figure 3:
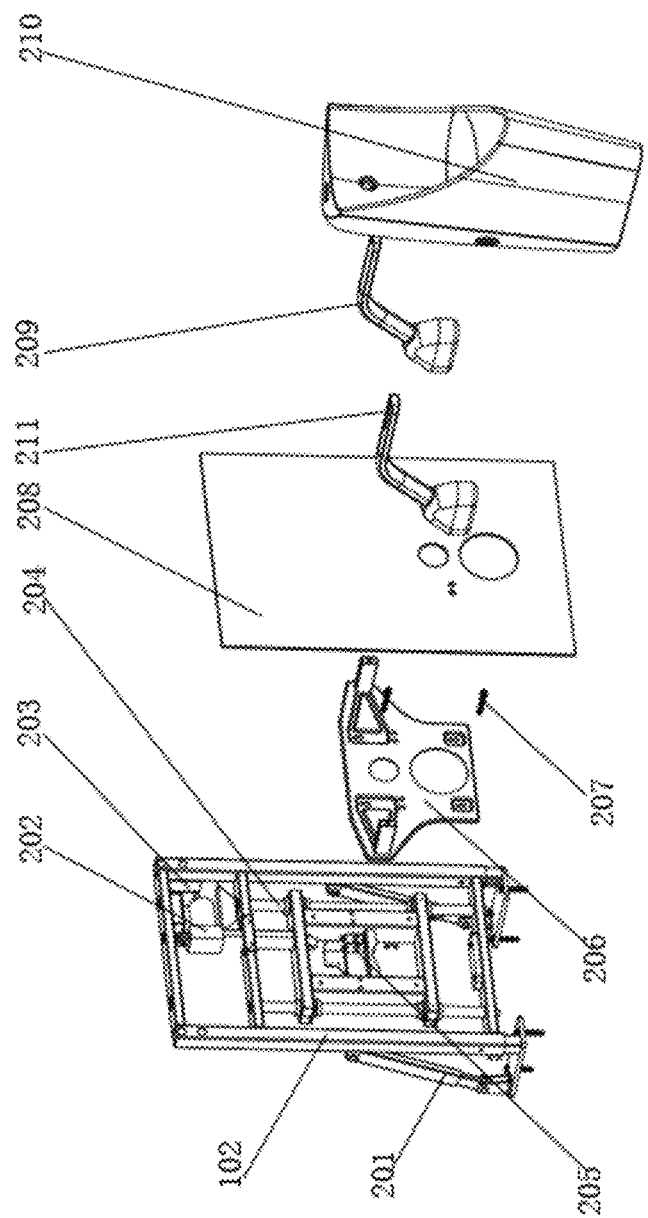
FIG. 3 is an exploded view of a lower bracket assembly according to Embodiment 1.

FIG. 1 is a front view of a split-type automatic lifting bracket device according to Embodiment 1. FIG. 2 is a stereoscopic diagram of the split-type automatic lifting bracket device according to Embodiment 1. FIG. 3 is an exploded view of a lower bracket assembly according to Embodiment 1.

As shown in FIG. 1 and FIG. 2, a split-type automatic lifting bracket device of the present disclosure comprises an upper bracket assembly 101 and a lower bracket assembly 102.

As shown in FIG. 3, the lower bracket assembly 102 comprises: a self-supporting leg assembly 201 used for supporting the whole device, which may be only fixed on the ground, and may also be fixed with an object on the ground, behind, or left and right side. The self-supporting leg assembly 201 may be fixed on the ground, and may also be fixed on any plane where a lifting mechanism needs to be mounted. The self-supporting leg assembly 201 is provided with a lifting bracket 205. The lower bracket assembly 102 also comprises a push-pull power device 202, and the push-pull power device 202 drives the lifting bracket 205 to move up and down.

As shown in FIG. 3, a rolling guide device 204 is arranged between the self-supporting leg assembly 201 and the lifting bracket 205. The rolling guide device 204 comprises a rolling bearing and a guidepost, the rolling bearing is fixed on the lifting bracket 205, and the guidepost is fixed on the self-supporting leg assembly 201, so that the lifting bracket 205 moves up and down along the guidepost relative to the self-supporting leg assembly 201 under the drive of the push-pull power device 202. A linear bearing matched with a guide rail or a guide shaft 112 is mounted on the lifting bracket 205, so that the lifting bracket may move up and down along the guide rail or the guide shaft 112. A lifting board 206 and a panel 208 are sequentially mounted on the lifting bracket 205. The sanitary product is fixed on the lifting bracket 205 through a fixing bolt assembly.

In the embodiment, two guideposts are provided, which are arranged on the self-supporting leg assembly 201 in parallel along an up-down direction. Certainly, multiple guideposts may also be provided to limit up-down sliding of the lifting bracket 205.

The push-pull power device 202 is driven by a hydraulic, pneumatic or electric motor, and is matched with a corresponding mechanical transmission device. The mechanical transmission device is a gear transmission device, a worm transmission device or a gear-worm composite transmission device, etc., and outputs a pushing force of no greater than 4,000 N. One end of the push-pull power device is fixed with the self-supporting leg assembly 201, and the other end of the push-pull power device is fixed with the lifting bracket 205. The push-pull power device 202 may also be an existing hydraulic device or other suitable power devices, so as to provide power for the lifting bracket 205 to rise and descend.

The lifting bracket 205 is I-shaped, and the I-shaped lifting bracket 205 can provide a better structural strength. Certainly, the lifting bracket may also be of other shapes for strengthening the structural strength to bear or support heavy sanitary product loads. The lifting structure of the present disclosure may rise and descend automatically without needing an additional force to assist in height adjustment.

The push-pull power device 202 of the present disclosure is driven by a hydraulic, pneumatic or electric motor, and is matched with a corresponding mechanical transmission system. The mechanical transmission system is gear transmission, worm transmission or gear-worm transmission, etc., and outputs a pushing force of no greater than 4,000 N.

One end of the push-pull power device 202 is fixed with the lifting bracket 205, and the other end of the push-pull power device is connected with the self-supporting leg assembly 201, so that a pushing or pulling force outputted by a telescopic rod directly acts on the lifting bracket 205.

The lifting bracket 205 may move up and down along the guidepost in the self-supporting leg assembly 201, and the guidepost is designed on the self-supporting leg assembly 201, so that a size of the guidepost is more accurate, and the sanitary product 210 is more stable to rise and descend. The self-supporting leg assembly 201 is then fixed with a wall or the ground. During use, when the push-pull power device 202 retracts the telescopic rod inwardly, the lifting bracket 205 moves upwardly along the guidepost under an action of the push-pull power device 202, and the sanitary product 210 rises. When the push-pull power device 202 extends the telescopic rod outwardly, the lifting bracket 205 moves downwardly along the guidepost under an action of the push-pull power device 202, and the sanitary product 210 descends.

In the embodiment, the sanitary product 201 is a toilet.

In the present disclosure, the push-pull power device 202 is used to pull the toilet to rise and descend along the guidepost, so as to meet needs of different people. When the push-pull power device 202 is driving, it could make the toilet rise and descend by only receiving a signal, without needing an additional force to assist in height adjustment of the toilet. When children go to the bathroom, the toilet may descend to a convenient position for children to sit down and get up. When the elderly go to the bathroom, the toilet may rise to a comfortable position for the elderly to sit down and get up. When the disabled go to the bathroom, the toilet may be adjusted to an optimal position suitable for the disabled to get up and sit down.

In the embodiment, the sanitary product 210 comprises a water receiver. In an embodiment, the water receiver may be a water receiver 214.

As shown in FIG. 1, the present disclosure is a lifting technology of a fixed bracket-type sanitary product, which comprises the water receiver 214 or the waterway control valve, the upper bracket assembly 101 and the lower bracket assembly 102. The lower bracket assembly 102 comprises the self-supporting leg assembly 201, the push-pull power device 202, the automatic lifting control device 203 (the control switch 203 and the control mainboard 203), the rolling guide device 204 (the guidepost 204 and the rolling bearing 204), the lifting bracket 205, the lifting board 206, the fixing bolt 207 of the lifting board, the panel 208, the auxiliary standing device 209 and the sanitary product 210.

Figure 4:
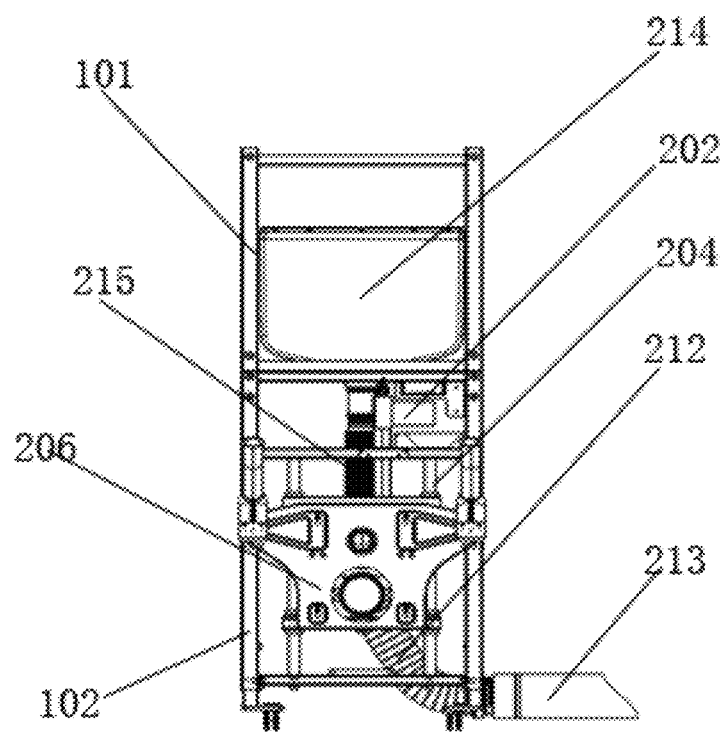
FIG. 4 is a schematic diagram of connection of a sewage pipeline according to Embodiment 1.
Figure 5:
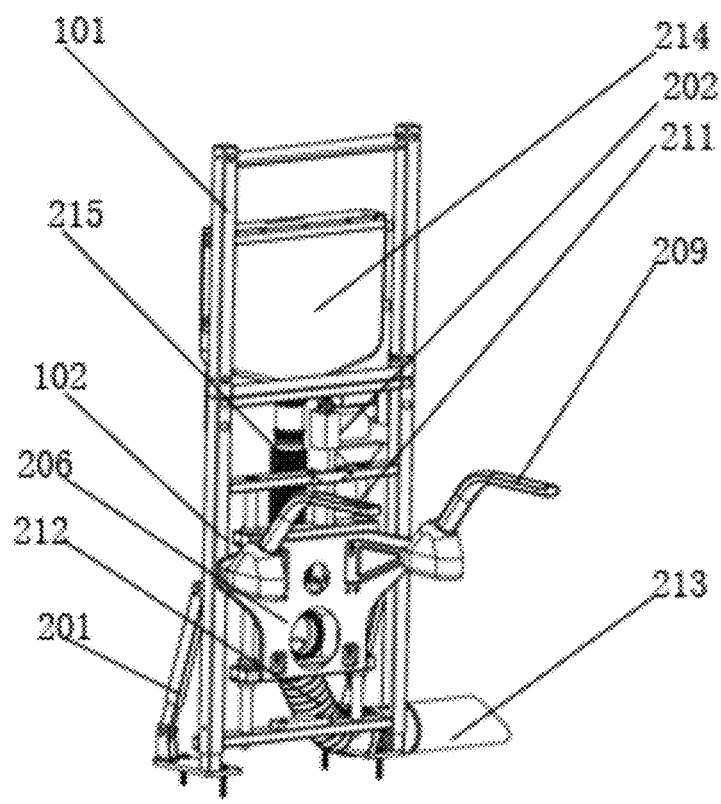
FIG. 5 is a stereoscopic diagram of connection of the sewage pipeline according to Embodiment 1.

FIG. 4 is a schematic diagram of connection of a sewage pipeline according to Embodiment 1. FIG. 5 is a stereoscopic diagram of connection of the sewage pipeline according to Embodiment 1.

As shown in FIG. 4 and FIG. 5, the water receiver 214 or the waterway control valve is fixed on a back wall or the upper bracket assembly 101, and a water inlet pipeline is directly or indirectly connected with the lifting bracket 205. One end of a sewage pipeline is directly or indirectly connected with the lifting bracket 205, and the other end of the sewage pipeline is connected with a sewage outlet. One end of the push-pull power device 202 is directly or indirectly connected with the self-supporting leg assembly 201, and the other end of the push-pull power device 202 is directly or indirectly connected with the lifting bracket 205. The lifting board 206 is directly or indirectly connected with the lifting bracket 205 through the fixing bolt 207 of the lifting board, and the panel 208 and the sanitary product 210 are directly or indirectly connected with the lifting bracket 205 through the fixing bolt. The rolling bearing 204 is mounted on the lifting bracket 205, and the guidepost 204 is mounted on the self-supporting leg assembly 201. Extension or retraction of the push-pull power device 202 is controlled through the control switch 203.

Motor output of the push-pull power device 202 (which may rotate forward and backward) drives the telescopic rod to extend and retract through the corresponding mechanical transmission system.

The self-supporting leg assembly 201 is fixed on the wall or the ground, and the lifting bracket 205 moves up and down along the guidepost 204 relative to the self-supporting leg assembly 201 by extension and retraction of the push-pull power device 202, so as to meet rising and descending requirements of the sanitary product 210.

The water receiver 214 is fixed on the back wall or the upper bracket assembly 101, and the water inlet pipeline is directly or indirectly connected with the lifting bracket 205. The water receiver 214 and the water inlet pipeline 215 of the toilet are connected by a flexible pipeline or a telescopic structure to meet a telescopic requirement. A middle of a sewage pipe 212 of the toilet is connected by a flexible pipeline or a telescopic structure to meet a telescopic requirement.

When a user uses the lifting structure, a rising/descending control switch 211 is pressed, the push-pull power device 202 starts to work, and the telescopic rod extends/retracts, so that the lifting bracket 205 moves up/down along the guidepost, thus make the sanitary product 210 rise/descend.

Embodiment 2

In the embodiment, the toilet 110 does not comprise the water receiver 101.

The toilet is mounted on the lifting bracket 205 and may move up and down along with the lifting bracket 205.

A water inlet pipe 215 of the toilet is directly and hermetically connected with a tap water source through a flexible pipeline or a telescopic structure.

A sewage pipe 212 of the toilet is hermetically connected with a sewage pipe 213 of a building through a flexible pipeline or a telescopic structure.

The water receiver or the waterway control valve is not provided on the lifting bracket 205, so that a weight for the lifting structure to rise is reduced, and the movable toilet may be driven by the push-pull power device 202 with a lower power, thus reducing a cost. Since a weight of a movable part is reduced, a stress on the rolling guide device 204 and other components is reduced, and a service life of each part of the lifting structure is prolonged.

Other parts that are the same as those in Embodiment 1 will not be repeated.

Embodiment 3

In the embodiment, the sanitary product is a basin.

The basin is mounted on the lifting bracket 205 and may move up and down along with the lifting bracket 205.

A water inlet pipe 215 of the basin is directly and hermetically connected with a tap water source through a flexible pipeline or a telescopic structure.

A sewage pipe 212 of the basin is hermetically connected with a sewage pipe 213 of a building through a flexible pipeline or a telescopic structure.

Other parts that are the same as those in Embodiment 1 will not be repeated.

Embodiment 4

In the embodiment, the sanitary product is a shower room stool.

The shower room stool is mounted on the lifting bracket 205 and may move up and down along with the lifting bracket 205.

Other parts that are the same as those in Embodiment 1 will not be repeated.

Embodiment 5

In the embodiment, the sanitary product is a toilet seat.

The toilet seat is mounted on the lifting bracket 205 and may move up and down along with the lifting bracket 205.

The water inlet pipe 215 of the toilet is directly and hermetically connected with a tap water source or the water receiver 214 through a flexible pipeline or a telescopic structure.

The sewage pipe 212 of the toilet is hermetically connected with a sewage pipe 213 of a building through a flexible pipeline or a telescopic structure.

Other parts that are the same as those in Embodiment 1 will not be repeated.

Embodiment 6

In the embodiment, the sanitary product is a urinal.

The urinal is mounted on the lifting bracket 205 and may move up and down along with the lifting bracket 205.

A water inlet pipe 215 of the urinal is directly and hermetically connected with a tap water source through a flexible pipeline or a telescopic structure.

A sewage pipe 212 of the urinal is hermetically connected with a sewage pipe 213 of a building through a flexible pipeline or a telescopic structure.

Other parts that are the same as those in Embodiment 1 will not be repeated.

The lifting structure of the present disclosure may be used in various other occasions needing rising and descending, especially in the sanitary product, so as to meet needs of various heights.

Figure 6:
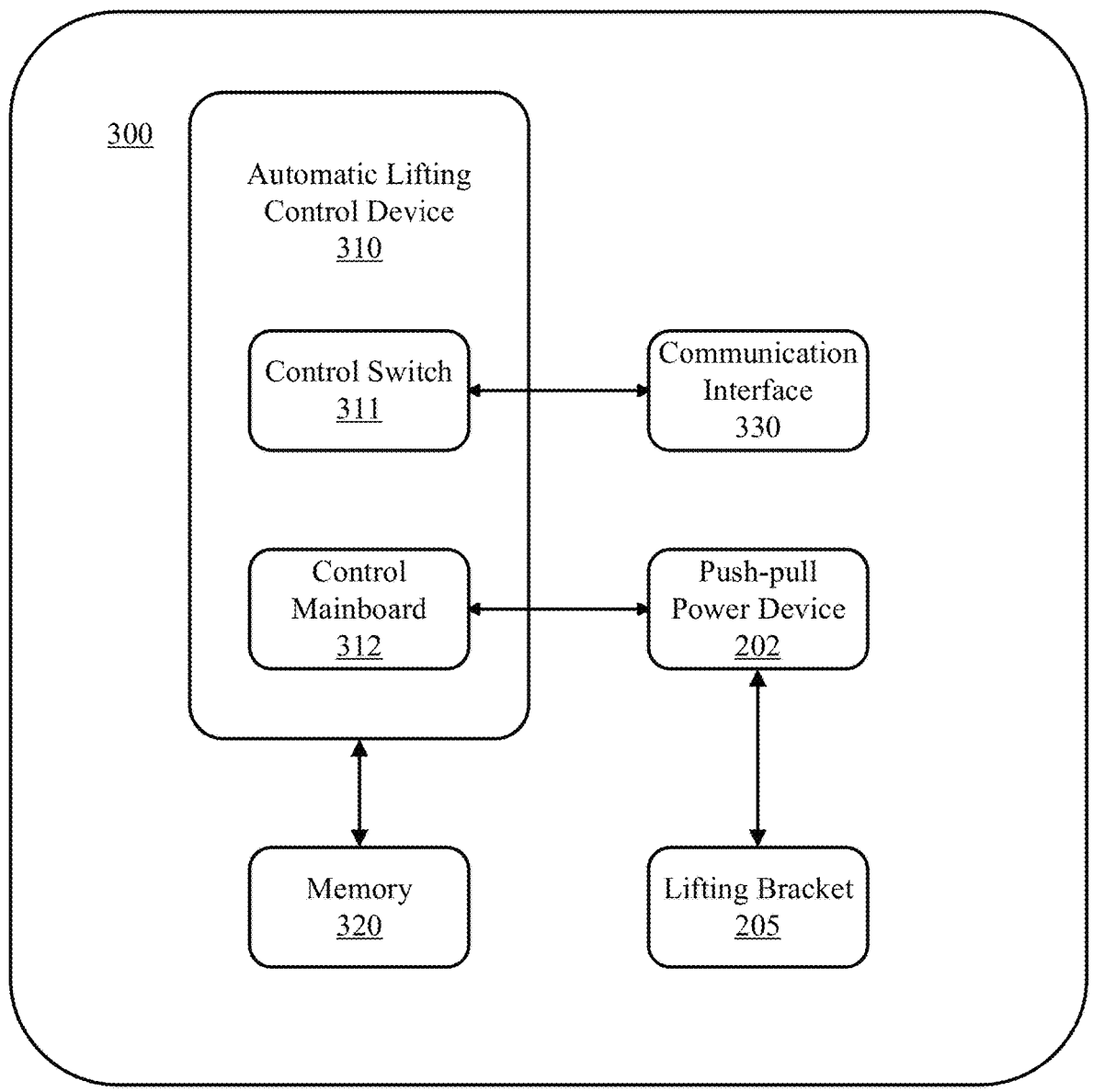
FIG. 6 is a block diagram, illustrating a system for controlling the split-type automatic lifting bracket device according to an embodiment of the present disclosure.

FIG. 6 is a block diagram, illustrating a system 300 for controlling the split-type automatic lifting bracket device according to any embodiments of the present disclosure as discussed above.

The system 300 may include a controller 310, a memory 320 communicably connected to the controller, and a communication interface 330.

In an embodiment, the controller 310 may be an automatic lifting control device and can be implemented by any appliances. The automatic lifting control device 310 may comprise a control switch 311 and a control mainboard 312 communicably connected to the control switch 311.

The control switch 311 is communicably connected to the communication interface 330 and configured to receive command, control, or communication decisions from the communication interface 330. In an embodiment, the control switch 311 is mounted on the auxiliary standing device 209 or the panel 208.

The control mainboard 312 is communicably connected to the control switch 311 and the push-pull power device 202 and configured to control the push-pull power device 202 to drive the lifting bracket 205. As discussed above, one end of the push-pull power device 202 is directly or indirectly connected with the lifting bracket 205. Specifically, when a user inputs a command, control, or communication decision into the communication interface 330, the control switch 311 receives the command, control, or communication decision from the communication interface 330 and transmits the command, control, or communication decision to the control mainboard 312. In response to the command, control, or communication decision, the control mainboard 312 instructs the push-pull power device 202 to generate a driving force for the lifting bracket 205 to move up and down along the guidepost 204 relative to the self-supporting leg assembly 201 as discussed above.

The components of the controller 310 may communicate using bus. The controller may be connected to a workstation or another external device (e.g., control panel, remote) and/or a database for receiving user inputs, system characteristics, and any of the values described herein. Optionally, the controller 310 may include an input device and/or a sensing circuit in communication with any of the sensors. The sensing circuit receives sensor measurements from as described above. Optionally, the controller 310 may include a drive unit for receiving and reading non-transitory computer media having instructions. Additional, different, or fewer components may be included. The controller 310 may comprise a processor configured to perform instructions stored in memory for executing the algorithms described herein.

The processor may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

The memory 320 may include one or more devices (e.g., memory units, memory devices, storage devices, etc.) for storing data and/or computer code for completing and/or facilitating the various processes described in the present disclosure. Memory may include random access memory (RAM), read-only memory (ROM), hard drive storage, temporary storage, non-volatile memory, flash memory, optical memory, or any other suitable memory for storing software objects and/or computer instructions. Memory may include database components, object code components, script components, or any other type of information structure for supporting the various activities and information structures described in the present disclosure. The memory 320 may be communicably connected to processor via a processing circuit and may include computer code for executing (e.g., by processor) one or more processes described herein. For example, the memory 320 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 330 may include any operable connection. An operable connection may be one in which signals, physical communications, and/or logical communications may be sent and/or received. An operable connection may include a physical interface, an electrical interface, and/or a data interface. The communication interface 330 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The present disclosure is not limited to the embodiments discussed above. The above description of the specific embodiments is intended to describe and explain the technical solutions of this application. The apparent transformation or substitution based on the inspiration of the present disclosure shall also be considered as falling within the scope of protection of the present disclosure. The above specific embodiments are used to reveal the implementation method of the present disclosure, so that those of ordinary skills in the art can apply various embodiments and alternative ways of the present disclosure to achieve the objectives of the present disclosure.

We claim:

1. A split-type automatic lifting bracket device, comprising:
   an upper bracket assembly configured to support a water receiver and/or a waterway control valve;
   a lower bracket assembly configured to support and drive a sanitary product to rise and descend, the lower bracket assembly comprising:
      a self-supporting leg assembly configured to support the split-type automatic lifting bracket device;
      a lifting bracket movably connected with the self-supporting leg assembly through a rolling guide device;
      a push-pull power device fixed with the self-supporting leg assembly at a first end of the push-pull power device, fixed with the lifting bracket at a second end of the push-pull power device, and configured to provide a driving force for the sanitary product to rise and descend; and
      the rolling guide device comprising a rolling bearing and a guidepost, wherein the rolling bearing is fixed on the lifting bracket and the guidepost is fixed on the self-supporting leg assembly so that the lifting bracket moves up and down along the guidepost relative to the self-supporting leg assembly under the driving force of the push-pull power device;
   an auxiliary standing device comprising a handrail, wherein the auxiliary standing device is fixedly connected with the lifting bracket through a lifting board and is configured to rise and descend together with the sanitary product; or wherein the auxiliary standing device is fixed on the self-supporting leg assembly and is configured not to rise and descend with the sanitary product.

2. The split-type automatic lifting bracket device according to claim 1,
   wherein the push-pull power device is driven by a hydraulic, pneumatic or electric motor and is matched with a corresponding mechanical transmission system, and
   wherein the corresponding mechanical transmission system comprises a gear transmission system, a worm transmission system, or a gear-worm composite transmission system and is configured to output the driving force of no greater than 4,000 N.

3. The split-type automatic lifting bracket device according to claim 2, wherein the self-supporting leg assembly is fixed on the ground and/or is fixed with an object disposed on the ground, disposed behind the split-type automatic lifting bracket device, disposed on a left side of the split-type automatic lifting bracket device, or disposed on a right side of the split-type automatic lifting bracket device.

4. The split-type automatic lifting bracket device according to claim 3, further comprising: a panel mounted between the sanitary product and the lifting bracket,
   wherein the panel is made of glass, engineering plastic, ceramic, or metal material.

5. The split-type automatic lifting bracket device according to claim 4, further comprising: an automatic lifting control device,
   wherein the automatic lifting control device comprises a control switch and a control mainboard, and
   wherein the control switch controls the push-pull power device through the control mainboard to drive the lifting bracket to move up and down.

6. The split-type automatic lifting bracket device according to claim 5, wherein the control switch is mounted on the auxiliary standing device or the panel.

7. The split-type automatic lifting bracket device according to claim 6,
wherein a body of the sanitary product is connected with the lifting bracket,
wherein a water source of the body of the sanitary product is split from the lifting bracket; and
wherein the body of the sanitary product comprises a flexible pipeline or a telescopic structure and is directly or indirectly connected with the water source and/or a sewage pipeline.

8. The split-type automatic lifting bracket device according to claim 7,
wherein a first end of the sewage pipeline is communicated with the body of the sanitary product and fixed on the lifting bracket at the same time, and
wherein a second end of the sewage pipeline is flexibly and hermetically communicated with the sewage pipeline of a building.

9. The split-type automatic lifting bracket device according to claim 8, wherein the sewage pipeline is mounted and fixed at an inclination angle.

10. A sanitary product, comprising the split-type automatic lifting bracket device, wherein the split-type automatic lifting bracket device comprises:
an upper bracket assembly configured to support a water receiver and/or a waterway control valve;
a lower bracket assembly configured to support and drive a sanitary product to rise and descend, the lower bracket assembly comprising:
a self-supporting leg assembly configured to support the split-type automatic lifting bracket device;
a lifting bracket movably connected with the self-supporting leg assembly through a rolling guide device;
a push-pull power device fixed with the self-supporting leg assembly at a first end of the push-pull power device, fixed with the lifting bracket at a second end of the push-pull power device, and configured to provide a driving force for the sanitary product to rise and descend; and
the rolling guide device comprising a rolling bearing and a guidepost, wherein the rolling bearing is fixed on the lifting bracket and the guidepost is fixed on the self-supporting leg assembly so that the lifting bracket moves up and down along the guidepost relative to the self-supporting leg assembly under the driving force of the push-pull power device; and
an auxiliary standing device comprising a handrail, wherein the auxiliary standing device is fixedly connected with the lifting bracket through a lifting board and is configured to rise and descend together with the sanitary product; or wherein the auxiliary standing device is fixed on the self-supporting leg assembly and is configured not to rise and descend with the sanitary product.

11. The sanitary product according to claim 10, wherein the sanitary product is a toilet, a basin, a shower room stool, a toilet seat or a urinal.

12. A lower bracket assembly for supporting and driving a sanitary product to rise and descend, the lower bracket assembly comprising:
a self-supporting leg assembly configured to support the split-type automatic lifting bracket device;
a lifting bracket movably connected with the self-supporting leg assembly through a rolling guide device;
a push-pull power device fixed with the self-supporting leg assembly at a first end of the push-pull power device, fixed with the lifting bracket at a second end of the push-pull power device, and configured to provide a driving force for the sanitary product to rise and descend;
the rolling guide device comprising a rolling bearing and a guidepost, wherein the rolling bearing is fixed on the lifting bracket and the guidepost is fixed on the self-supporting leg assembly so that the lifting bracket moves up and down along the guidepost relative to the self-supporting leg assembly under the driving force of the push-pull power device; and
an auxiliary standing device comprising a handrail,
wherein the auxiliary standing device is fixedly connected with the lifting bracket through a lifting board and is configured to rise and descend together with the sanitary product; or wherein the auxiliary standing device is fixed on the self-supporting leg assembly and is configured not to rise and descend with the sanitary product.

13. The lower bracket assembly according to claim 12,
wherein the push-pull power device is driven by a hydraulic, pneumatic or electric motor and is matched with a corresponding mechanical transmission system, and
wherein the corresponding mechanical transmission system comprises a gear transmission system, a worm transmission system, or a gear-worm composite transmission system and is configured to output the driving force of no greater than 4,000 N.

14. The lower bracket assembly according to claim 13, wherein the self-supporting leg assembly is fixed on the ground and/or is fixed with an object disposed on the ground, disposed behind the split-type automatic lifting bracket device, disposed on a left side of the split-type automatic lifting bracket device, or disposed on a right side of the split-type automatic lifting bracket device.

15. The lower bracket assembly according to claim 14, further comprising a panel mounted between the sanitary product and the lifting bracket,
wherein the panel is made of glass, engineering plastic, ceramic, or metal material.

16. The lower bracket assembly according to claim 15, further comprising an automatic lifting control device,
wherein the automatic lifting control device comprises a control switch and a control mainboard, and
wherein the control switch controls the push-pull power device through the control mainboard to drive the lifting bracket to move up and down.

17. The lower bracket assembly according to claim 15, wherein the control switch is mounted on the auxiliary standing device or the panel.

18. The lower bracket assembly according to claim 16,
wherein a body of the sanitary product is connected with the lifting bracket,
wherein a water source of the body of the sanitary product is split from the lifting bracket; and
wherein the body of the sanitary product comprises a flexible pipeline or a telescopic structure and is directly or indirectly connected with the water source and/or a sewage pipeline.

* * * * *